Patented Sept. 17, 1940

2,214,768

UNITED STATES PATENT OFFICE 2,214,768

ENGINE FUEL

Bert H. Lincoln, Ponca City, Okla., assignor, by mesne assignments, to The Lubri-Zol Development Corporation, Cleveland, Ohio, a corporation of Delaware No Drawing. Application February 5, 1938, Serial No. 188,993

11 Claims. (Cl. 44—9)

This invention relates to motor fuel and more particularly to new compositions of matter which will efficiently and economically give top cylinder lubrication by injection through the fuel system with the fuel.

The design and lubrication of present-day mechanical devices is such that there is a decided dearth of lubrication in the upper portion of the cylinders of internal combustion engines. Some lubricating oils are more efficient in giving satisfactrory lubrication in the upper cylinder regions than others, but the very best lubricating oils do not give satisfactory upper cylinder lubrication with present-day lubricating oil systems. It is believed that lubricants of high oiliness and high film strength characteristics are more efficient upper cylinder lubricants than those deficient in these properties, but since the means of delivering lubricating oil from the lubricating oil sump to the upper cylinder portion of the engine is far from being perfected, the most efficient lubricants do not perform satisfactorily. One satisfactory means of obtaining this required lubrication is by the introduction of certain materials into the fuel being burned.

The materials disclosed in this invention are very satisfactory for this purpose, and will partially accomplish the result if introduced into the lubricating oil sump, but other desirable results are accomplished by introducing the essence material with the fuel.

Some of the desired requirements of a top cylinder lubricant will indicate the very great advantages of adding the lubricating material to the fuel. Among the most important of these features are:

(1) carbon-solvent action;
(2) penetrating characteristics;
(3) reduced coefficient of friction under boundary lubrication conditions existing in the region;
(4) extreme pressure or high film strength;
(5) decreasing the clearance between cylinder and piston by building up a stable film of lubricant on both the cylinder and piston surfaces.

The above characteristics are apparent in the following improvements of operation:

1. Reduced knocking tendencies.
2. Less frequent removal of carbon.
3. Less wear on rubbing surfaces.
4. Smoother engine operation.
5. Less power requirement from the motor (increased mileage from fuel due to low coefficient of friction and greater mileage on lubricating oil).
6. Longer life of piston rings.
7. Prevention of frozen piston rings and sticky valves.
8. Reduced "run-in" time on engine after overhauls.
9. Reduced valve grinding.
10. Cooling effect during combustion, thereby reducing possibilities of cracked cylinder heads caused by high operating temperatures.
11. Reduced possibilities of crank case dilution by keeping clearance between piston and cylinder at a minimum both from wear standpoint and from film formed.
12. Easier starting characteristics under cold temperatures starting of the motor. This is due to the lubricant remaining on the rubbing surfaces and allowing easier movement for quick starting.
13. Greater acceleration due to greater ease of movement of piston and cylinder.

Improvements other than those noted above are obtained depending upon the type of engine being considered, lubricant being used in the crank case, and nature of the fuel, but the above are sufficient to indicate the vast improvements.

Carbon solvent action is considered of primary importance, since it is the foremost requisite of an upper cylinder lubricant. Carbon solvent action is characterized by the ability to dissolve gummy materials from the engine parts. When the carbon particles are loosened and removed from the engine surfaces, the carbon is expelled through the exhaust system of the engine. The penetrating property is important, in that it maintains a lubricating film on the surface of the moving parts and acts as a lubricant when the engine is first started and prior to the time the lubricating system is functioning properly. It is evident that if the lubricating system is not so designed to deliver lubricating oil to the upper cylinder walls, there is an additional feature of having a lubricant present in the upper cylinder region at all times by introducing it through the fuel system. The penetrating properties are also of importance in removinng gum deposits, since they have a tendency to migrate into the tight interstices and saturate the valence bonds of the metal, thus releasing the gum or carbon deposits.

In use a satisfactory upper cylinder lubricant should enter the combustion chamber in spray form, rather than vapor form, as encountered with volatile fuels. In other words, the vapor pressure of the essence material to be used as a top cylinder lubricant should be sufficiently low to maintain the material as a liquid spray and less subject to combustion in the combustion chamber. If this is accomplished, the essence material will condense or drop out on the metal surfaces and thus act as a lubricant. The vapor pressure of the top cylinder lubricant to be used will depend largely upon the type of fuel and its vaporization temperature, as well as the temperature of operation of the engine. Those skilled in the art of combustion engines can very easily determine materials of the proper vapor pressure range to be satisfactory for any given service. For use in the more volatile fuels, such as gasoline, the vapor pressure of the essence material should preferably remain below atmospheric pressure at temperatures up to about 140° C., and in some cases up to about 170° C. or even 200° C. For use in heavier fuels it may be desirable that the vapor pressure of the essence material remain below atmospheric pressure up to still higher temperatures, for example 250° C., or even 300° C. It is also possible by blending various essence materials with other higher or lower boiling essence materials to obtain the desired and prerequisite vapor pressure for the conditions under consideration. The desired result of top cylinder lubrication is not solely obtained by materials of a given vapor pressure range, since the essence material should also be designed to give the solvent dissolving action, penetrating action, low coefficient of friction, high film strength, et cetera. All of these desirable results and others are obtained when using the products of my invention.

It is desirable that the stability of the essence material be such that it will not be readily decomposed by contact with such surfaces as the cylinder walls under operating conditions. It is sometimes further desirable that the essence material should not be substantially decomposed by exposure to temperatures up to its boiling point.

From the above discussion the objects of my invention are apparent. All of the compounds or essence materials disclosed accomplish the very desirable results above described when used with the fuel either alone or mixed with each other, or mixed with higher boiling or lower boiling hydrocarbon compounds to give the desired boiling range.

Among the so-called essence materials, which may be employed for the purpose of accomplishing the above-named desirable ends, are the halogenated ring compounds and more specifically the halogenated aromatic compounds.

I have found that a very desirable essence material for the above-mentioned uses may be produced by a combination of the above-mentioned halogenated compounds with mineral oil, particularly when such mineral oil has certain characteristics as hereinafter particularly pointed out.

As examples of the above-named general class of halogen compounds which may be employed, the following are given:

EXAMPLE I.—*Halogenated acids*

Fatty acids have been used in motor fuels and top cylinder lubricants but such are deficient in film strength and carbon solvent action. Using halogenated aromatic acids, these objections are very effectively overcome. The type halogenated acid to be used depends largely upon the operating conditions and the results desired. Halogenated acids containing eight or more carbon atoms are usually satisfactory from a boiling point range standpoint and entirely satisfactory for contributing other desirable characteristics.

These halogenated ring compound acids may be of the aromatic or heterocyclic series and either the saturated or unsaturated type.

Examples of halogenated aromatic acids are:

Chlorobenzoic acid
    Tetrachlorophthalic acid
    Chlorinated naphthoic acid
    Chlorinated toluic Examples of the heterocyclic acids are:

Chlorofuroic acid
    Chloropicolinic acid
    Chlorothiophene carboxylic acid
    Dichloroquinoline 4 carboxylic acid Since the carboxyl group may be held constant, it is evident that the substituted products of the various acids mentioned after halogenation are satisfactory.

EXAMPLE II.—*Halogenated phenyl benzols*

The halogenated phenyl benzols are very satisfactory for us in my invention. As an example of the phenyl benzol group, diphenyl may be mentioned. Any of the other phenyl benzols and their substitution products, after halogenation, are satisfactory for use in my invention.

EXAMPLE III.—*Halogenated cyclo aliphatics including the hydro aromatics*

The class of compounds known as cyclo aliphatics and their substitution and addition products are very satisfactory after halogenation for use in my invention.

Compounds of the cyclo-hexane type, after halogenation, will be found satisfactory, as well as the cyclo-heptane and cyclo-octane type compounds. The naphthenes generally such as the cyclo-hexanes and cyclo-hexenes, cyclo-heptenes and cyclo-octenes after halogenation are examples of this class of compounds which are quite satisfactory for use in my invention.

EXAMPLE IV.—*Halogenated diphenylene oxide*

Halogenated diphenylene oxide will be found to be very satisfactory for use within my invention. The halogenated substitution products of diphenylene oxide such as methyl, di-methyl, ethyl, di-ethyl, are particularly desirable for use.

As representative examples of halogenated substitution products of diphenylene oxide, the following may be mentioned:

Dichloromethyl diphenylene oxide
    Dichlorodimethyl diphenylene oxide
    Dichloroethyl diphenylene oxide
    Dichlorodiethyl diphenylene oxide
    Chloro lauryl diphenylene oxide
    Chloro lauryl chlorodiphenylene oxide
    Chloro phenyl diphenylene oxide
    Chloro phenyl chlorodiphenyl oxide It will be observed that the two last-named of the above are examples of halogenated aryl substitution products of diphenyl oxide, and that the other specific examples may be classified as halogenated alkylated diphenylene oxide.

EXAMPLE V.—*Diphenylene oxide-halogenated acid condensation product*

Upon condensing halogenated acid with diphenylene oxide by any of the well-known condensation reactions, a product results which is entirely satisfactory for use within my invention. Any of the halogenated acids may be used for the condensation, as well as diphenylene oxide and its substitution products.

Specific examples of the halogenated acids which may be thus used are:

Chlorinated stearic acid
Chlorinated lauric acid
Chlorinated oleic acid
Chlorinated caprylic acid The substitution products of diphenylene oxide which may thus be employed are the same as those previously identified which, when halogenated, may be advantageously employed alone.

EXAMPLE VI.—*Halogenated aromatic ethers*

The various aromatic ethers, after halogenation may be employed in my invention. The mixed aliphatic and aromatic ethers, after halogenation, will also be found to be quite satisfactory. Specific examples of halogenated aromatic ethers suitable for use as or in essence materials are the halogen-bearing substitution and addition products of diphenyl ether ditolyl ether, phenyl ethyl ether, and phenyl octadecal ether.

EXAMPLE VII.—*Halogenated aromatic alcohols*

Various halogenated aromatic alcohols are satisfactory for use within my invention and as examples of such the following may be mentioned, viz:

p-chloro benzyl alcohol
o-o' Dibromo benzhydrol
Chlorophenyl chlorobutanol
Chloronaphthyl chloroethanol EXAMPLE VIII.—*Halogenated ketones*

The various ring compound ketones, after halogenation, may be satisfactorily employed in my invention. As specific examples of these, the following may be mentioned:—

(1) p,p'- Dichloro benzophenone
(2) o,o'-Dichloro benzil
(3) 4-chloro-α-naphthyl mesityl ketone
(4) 2,2' dichloro-4,4' diphenyl-benzophenone EXAMPLE IX.—*Halogenated aldehydes*

The halogenated ring compound aldehydes may be employed in practicing my invention. Specific examples of these are as follows:

(1) o-Chlorobenzaldehyde
(2) α-Chloro-B-naphthaldehyde
(3) 3,5-Dibromomesitylaldehyde EXAMPLE X.—*Halogenated esters*

The halogenated ring compound esters will be found to be useful in carrying out the principles of my invention and as specific examples of such, the following may be named:—

(1) Benzyl p-chlorobenzoate
(2) Methyl 4-chloro-1-naphthoate
(3) o-Chlorobenzyl-o-chloro-p-toluate
(4) Lauryl o-chlorobenzoate EXAMPLE XI.—*Halogenated aromatic substitution products*

It should be noted that halogenated substitution products of aromatic compounds generally are suitable for my purpose and that certain of them, notably the halogenated alkylated substitution products of aromatic compounds, possess desirable characteristics which make their use preferable for certain types of fuels and engines over many of the other types of compounds hereinidentified.

The degree of halogenation to be used on the products of my invention will vary over wide limits, depending upon the type of compound being halogenated, its subsequent use, and the results desired. For example, a halogen content of as low as 1% by weight may be satisfactory in some cases, and as much as 40% by weight or more may be required in other cases. This invention does not contemplate covering any method of halogenation, since any of the well-known means of introducing halogen atoms into organic compounds is effective and those skilled in the art can select the most satisfactory method. The halogens are covered as a family, since they all resemble each other in character and properties. Bromine and iodine are satisfactory, but rather expensive and, therefore, of less immediate commercial value. Fluorine is difficult to handle and reacts with many organic compounds with violence and, therefore, is not generally as desirable as chlorine. Since chlorine is available on the market at relatively cheap prices in large quantities and is perfectly satisfactory for use in my invention, it may be considered the preferable member of the halogen family to use, it being understood, however, that all members of the halogen family are within the scope of my invention.

Varying quantities of the above halogenated compounds may be added to motor fuels, depending upon the usual variables encountered in commercial practice. Under some conditions and to accomplish some objectives, as little as 0.01% by volume or sometimes even .001% or less will be satisfactory. In other cases, larger quantities may be required, and as much as 5% by volume could be used. In the usual application of my invention, percentages ranging from .0001% to 1.0% by weight will be employed.

Those skilled in the art will realize that advantages may be obtained in some cases by blending one or more of the above-mentioned compounds to obtain one or more desirable characteristics from each and introduce new characteristics by the blend of the two. It is also possible to introduce one or more of the materials mentioned above into the motor fuel in solution with higher boiling lubricating oils, such as a low viscosity lubricant. For example, a heavy kerosene cut may be used and in other cases lubricating oils, say of 70 to 200 Saybolt viscosity at 100° F., might be required.

It will be observed that the heavy kerosene cut referred to above, when, for example, of Mid-Continent origin, generally has A. P. I. gravity from 35 to 38 and the oils having the viscosities above identified, i. e., from 70 to 200 at 100° F. range in A. P. I. gravity from about 25 to about 30. Therefore the A. P. I gravities of the above referred to oils with which the halogen compounds are to be blended have an A. P. I. gravity range of from about 25 to about 38.

In preparing an essence material which consists of a combination of a halogen compound or compounds and mineral oil which may advantageously (although not necessarily) be of the type above defined, a wide proportional relationship between the two constituents may be employed. For example, the following table gives four classes of essence compositions which will be found to possess characteristics which make such classes respectively particularly suitable for certain uses:

|  | Percent of halogen compound | Percent of oil |
| --- | --- | --- |
| Class I | 2-5 | 98-95 |
| Class II | 15-35 | 85-65 |
| Class III | 50-75 | 50-25 |
| Class IV | 100 |  |

From the foregoing table it will be observed that the material which may be added to a fuel such as gasoline in accordance with the principles of my invention, may vary from a composition consisting entirely of a halogen compound or compounds on one hand to a composition containing 99% of oil and only 1% of the halogen compound or compounds on the other hand. A motor fuel containing from about 0.2 to about 1.6% of mineral oil and from about 0.02 to about 0.4% of a halogenated aromatic compound is thus within the scope of my invention.

The A. P. I. gravity range above given is representative of the type of mineral oil which may be employed as a constituent of my improved engine fuel. Mineral oils having an A. P. I. gravity from about 18 to about 35 will be found entirely satisfactory.

It will be observed that mineral oils of 200 viscosity Saybolt at 100° F. generally have an A. P. I. gravity range from 25 to 27, however when such oils are derived from highly naphthenic or aromatic base crudes they will be observed to have A. P. I. gravities down to about 18.

From an inspection of my parent application Serial No. 713,012 upon which this application is based, it will be observed that all halogenated organic compounds of the proper vapor pressure stability, etc., as herein defined are suitable for use as essence materials in practicing my invention. This broad class of all halogenated organic compounds which have a vapor pressure less than atmospheric at the temperatures previously referred to; which will not be substantially decomposed under the conditions previously defined, and which are otherwise suitable from the standpoint of being compatible with the fuel and the metals of the engine parts, are particularly useful and provide generally superior results along the lines previously indicated, when they are employed, in the proportional relationship previously stated, in conjunction with mineral oil having an A. P. I. gravity from 18 to 38.

The halogenated oxygen bearing organic compounds which satisfy the above qualifications will also be found to be particularly suitable for certain types of use. The halogenated oxygen bearing ring compounds and more specifically the aromatic compounds are especially suitable for certain uses.

The upper cylinder lubricating essence material is blended with the carrier fluid as a concentrate and blended with the motor fuel as such. For example, a 50-50 blend of halogenated compound and neutral oil may be used.

The light oils of the viscosities above identified, which are to be employed as the carrier medium for the lubricating essence material have, in themselves, the property of dissolving the gummy substances which collect in the combustion chamber and associated parts of an internal combustion engine.

The essence materials above mentioned, i. e., the halogenated carbon ring compounds, or more particularly halogenated aromatic compounds, have, as previously indicated, a strong solvent action on such gummy deposits and accordingly, the combination of the oil-carrying medium and the essence material, has a greater solvent capacity for such gummy substances than the oil alone. Likewise, when this combination of constituents is added to a motor fuel such as gasoline, the solvent property of the gasoline for the gummy substance is raised considerably, due primarily in most instances, to the presence of the halogenated ring compounds.

As previously indicated, the average boiling range of the essence material added to the fuel may be adjusted to any desired value by a mixture of high and low boiling constituents. Obviously, the same expedient may be employed in the mixture of the halogenated compounds with the oil and accordingly, the viscosity ranges above given for the oil constituent may be extended beyond the stated values, if desired. However, for most purposes, oils have viscosities falling within the ranges specified will be found the most suitable for use with gasoline in spark ignition internal combustion engines of the type now commonly employed.

It will be observed that the mineral oils above referred to, such as the heavy kerosene cut and oils having a viscosity from 70 to 200 seconds at 100° F., i. e., mineral oils which fall within the general gravity range from about 25 to 38, are not generally regarded as lubricating oils in the sense that such term is used in defining oils for use in crankcases and gear boxes of automobiles and like machinery. The mixture of these light oils which, as indicated, may, in themselves, not possess what is generally termed a lubricating viscosity at temperatures encountered in an internal combustion engine, with the halogenated compounds above mentioned, does produce a composition, however, which is a very effective lubricant and particularly so for the lubrication of the upper cylinder parts of internal combustion engines.

After the proper upper cylinder lubricating material has been selected, it is only necessary to well mix the selected substance with the motor fuel to be used by any of the well-known means. For example, mechanical agitation will be satisfactory in most cases.

It will be understood that certain features and sub-combinations are of utility and may be employed without reference to other features and sub-combinations. This is further obvious that various changes may be made in details within the scope of my claims without departing from the spirit of my invention. It is, therefore, to be understood that my invention is not to be limited to the specific details shown and described.

This application is a continuation in part of my co-pending application Serial No. 713,012, filed February 26, 1934.

Other modes of applying the principle of my invention may be employed instead of the one explained, change being made as regards the materials employed, provided the ingredients stated by any of the following claims or the equivalent of such stated ingredients be employed.

I, therefore, particularly point out and distinctly claim as my invention:

1. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from 70 to 200 seconds Saybolt at 100° F. and a halogenated carbon ring compound.

2. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from 70 to 200 seconds Saybolt at 100° F. and a halogenated aromatic compound.

3. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from 70 to 200 seconds Saybolt at 100° F. and a halogenated hydroaromatic compound.

4. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from 70 to 200 seconds Saybolt at 100° F. and a halogenated cyclo-aliphatic compound.

5. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from 70 to 200 seconds Saybolt at 100° F. and a halogenated substitution product of an aromatic compound.

6. A motor fuel comprising a volatile combustible liquid with a boiling point range on the order of commercial gasoline and from about 0.01% to 1.00% of a substantially less volatile mineral oil having a viscosity of from 70 to 200 seconds Saybolt at 100° F. and from about 0.01% to 1.00% of a halogenated carbon ring compound.

7. A motor fuel comprising a volatile combustible liquid with a boiling point range on the order of commercial gasoline and a small amount, sufficient to increase the gum solventicity of the fuel, of a mixture of a substantially less volatile mineral oil having a viscosity of from that of heavy kerosene to about 200 seconds Saybolt at 100° F. and a halogenated carbon ring compound.

8. A motor fuel comprising a volatile combustible liquid with a boiling point range on the order of commercial gasoline and a small amount, sufficient to increase the gum solventicity of the fuel, of a mxture of a substantially less volatile mineral oil having a viscosity on the order of heavy kerosene and a halogenated carbon ring compound.

9. A motor fuel, comprising a gasoline having the gum-solventicity raised with about 0.2–1.6 per cent of a mineral oil of 18–35 gravity devoid of lubricating viscosity for internal combustion engine temperature and about 0.02–0.4 per cent of a halogenated aromatic compound.

10. A motor fuel, comprising a gasoline having its gum-solventicity raised with about 0.2–1.6 per cent of a mineral oil of 25–38 gravity devoid of lubricating viscosity for internal combustion engine temperature and about 0.02–0.4 per cent of a halogenated aromatic compound.

11. A motor fuel comprising a gasoline having its gum-solventicity raised with about 0.01% to 1.00% of a mineral oil of 25–38 gravity devoid of lubricating viscosity for internal combustion engine temperature and about 0.01% to 1.00% of a halogenated aromatic compound.

BERT H. LINCOLN.